(12) United States Patent
Kamiya et al.

(10) Patent No.: US 10,737,643 B2
(45) Date of Patent: Aug. 11, 2020

(54) ENGAGING MEMBER

(71) Applicants: DAIWA KASEI INDUSTRY CO., LTD., Okazaki-shi, Aichi (JP); TOYOTA JIDOSHA KABUSHIKI KAISHA, Toyota-shi, Aichi-ken (JP)

(72) Inventors: Haruhisa Kamiya, Okazaki (JP); Katsuya Hirakawa, Okazaki (JP); Shinji Oshita, Toyota (JP); Itsuo Wakabayashi, Seto (JP); Kazunori Takata, Toyota (JP)

(73) Assignees: DAIWA KASEI INDUSTRY CO., LTD., Okazaki-Shi, Aichi (JP); TOYOTA JIDOSHA KABUSHIKI KAISHA, Toyota-Shi, Aichi-Ken (JP)

( * ) Notice: Subject to any disclaimer, the term of this patent is extended or adjusted under 35 U.S.C. 154(b) by 0 days.

(21) Appl. No.: 16/598,451

(22) Filed: Oct. 10, 2019

(65) Prior Publication Data
US 2020/0114840 A1 Apr. 16, 2020

(30) Foreign Application Priority Data
Oct. 16, 2018 (JP) .................. 2018-195428

(51) Int. Cl.
*B60R 16/02* (2006.01)
*B65D 63/10* (2006.01)
*H02G 3/32* (2006.01)

(52) U.S. Cl.
CPC ...... *B60R 16/0215* (2013.01); *B65D 63/1027* (2013.01); *H02G 3/32* (2013.01); *B65D 2563/103* (2013.01)

(58) Field of Classification Search
CPC ............ B60R 16/0215; H65D 63/1027; B65D 2563/103; H02G 3/32
See application file for complete search history.

(56) References Cited

U.S. PATENT DOCUMENTS

| 6,390,841 B1* | 5/2002 | Zaguskin | H01R 13/6315 439/248 |
| 2004/0144899 A1* | 7/2004 | Rosemann | B60R 16/0215 248/71 |
| 2011/0272547 A1* | 11/2011 | Gotou | F16B 21/086 248/224.8 |

FOREIGN PATENT DOCUMENTS

| JP | H1089329 A | 4/1998 |
| JP | 2007282352 A | 10/2007 |
| JP | 2018101600 A | 6/2018 |

OTHER PUBLICATIONS

English Translation JP4034368B2 (Year: 1998).*

* cited by examiner

*Primary Examiner* — Steven T Sawyer
(74) *Attorney, Agent, or Firm* — McClure, Qualey & Rodack, LLP

(57) ABSTRACT

An engaging member includes an engaging portion configured to be inserted and assembled into a fixing hole of a vehicle body, an attachment portion configured to attach elongated wire routing materials, and linking portions configured to connect the engaging portion and the attachment portion to each other. The linking portions are extendable and contractable in a longitudinal direction of the wire routing materials, and can oscillate the engaging portion side in an orthogonal direction, thereby allowing the engaging portion to be movable in the longitudinal direction and the orthogonal direction. A protrusion and a through portion are provided as a movement restricting portion for restricting the movement of the engaging portion to movement within a predetermined range.

3 Claims, 9 Drawing Sheets

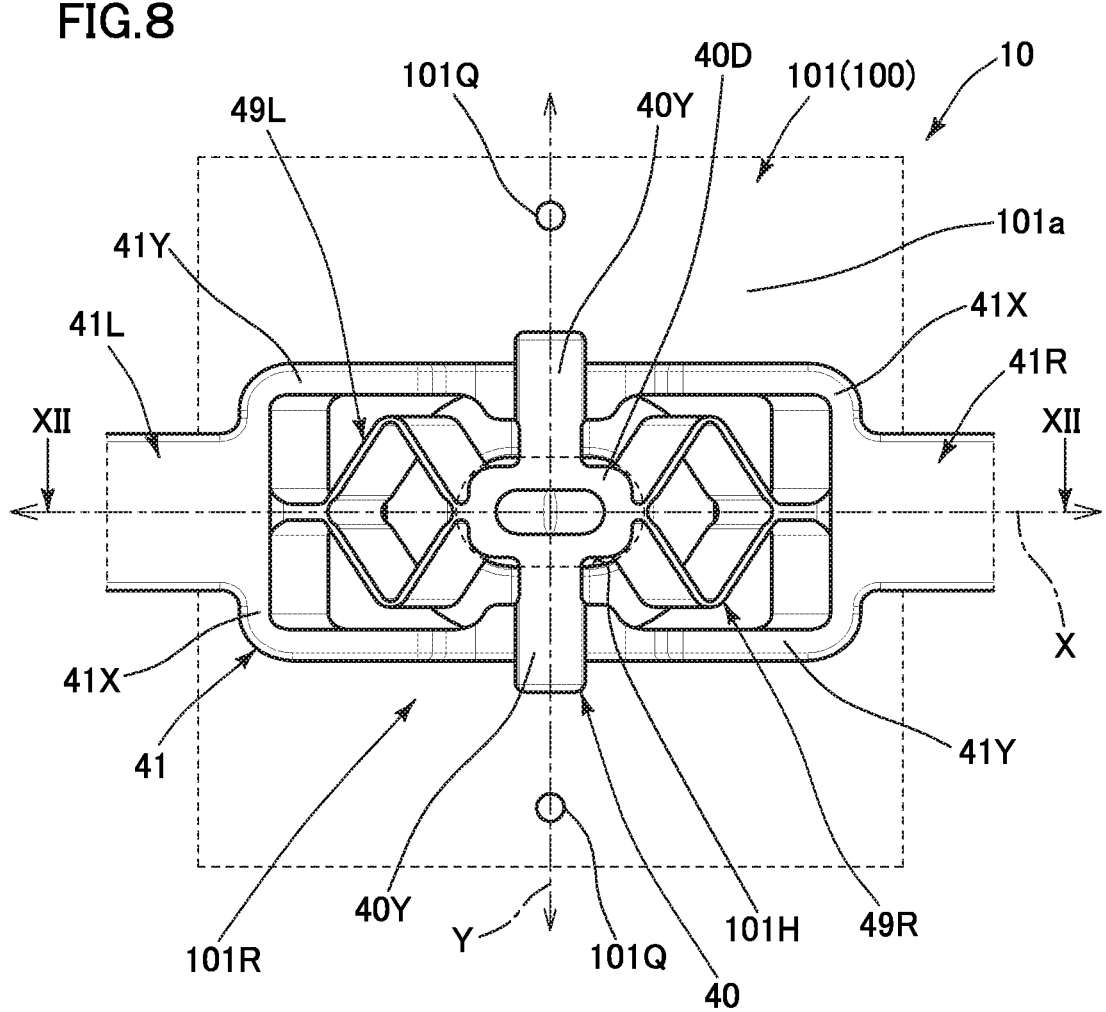

ENGAGING MEMBER

RELATED APPLICATIONS

This application claims the priority of Japanese Patent Application No. 2018-195428 filed on Oct. 16, 2018. The disclosure of the prior application is hereby incorporated herein in the entirety by reference.

BACKGROUND OF THE INVENTION

Field of the Invention

This invention relates to an engaging member.

Description of Related Art

For vehicles, a clamp described in, for example, Japanese Laid-Open Patent Publication No. 2007-282352 is used to hold a wire harness formed by a wiring group including a signal line and a power supply line, in a binding state, in a vehicle body.

An engaging member is bound and held together with the wire harness by using a belt, tape or the like, and, thus, the engaging member is attached integrally with the wire harness. Then, the engaging member that has been integrated with the wire harness is assembled to the vehicle body by an engaging portion thereof being inserted into a fixing hole of the vehicle body. A plurality of such engaging members are attached to the wire harness at predetermined positions in the longitudinal direction of the wire harness, and each of the engaging members is inserted and assembled into a fixing hole provided at the corresponding position in the vehicle body.

A technique for movably providing an engaging portion in such an engaging member is available (see Japanese Laid-Open Patent Publication No. 10-89329). In this case, even if there is some positional displacement between the engaging portion and the fixing hole of the vehicle body, the positional displacement can be absorbed by the movement of the engaging portion. In such a structure in which the engaging portion is movable, a large burden may be imposed on the movement mechanism of the engaging portion when an unexpected large load is imposed on the engaging portion in the movement direction.

An object of this invention is to enable, in an engaging member including an engaging portion configured to be movable, the movement mechanism to withstand a large load.

SUMMARY OF THE INVENTION

In order to attain the aforementioned object, an engaging member includes:

an engaging portion configured to be inserted and assembled into a fixing hole of a vehicle body;

an attachment portion configured to attach an elongated wire routing material;

a linking portion configured to connect the engaging portion and the attachment portion to each other such that the engaging portion is movable relative to the attachment portion in at least a longitudinal direction of the wire routing material attached by the attachment portion; and a movement restricting portion configured to restrict movement of the engaging portion relative to the attachment portion in one or both of an insertion direction in the fixing hole and the longitudinal direction, to movement within a predetermined range.

In the engaging member of this invention, the linking portion is provided as a movement mechanism for moving the engaging portion. The movement restricting portion for restricting movement of the engaging portion in one or both of the longitudinal direction and the insertion direction, is provided. Thus, an excessive movement or deformation of the linking portion is prevented by the movement restricting portion even if a large load is applied, and, therefore, an excessive load that causes a damage to the linking portion is not applied.

In this invention, the attachment portion may include first opposing wall portions that hold the engaging portion therebetween in the longitudinal direction, and the linking portion may include a first side linking portion that connects one of the first opposing wall portions and the engaging portion to each other, and a second side linking portion that connects the other of the first opposing wall portions and the engaging portion to each other. With this configuration, two linking portions are provided, and, therefore, the burden on the linking portions can be shared.

In this invention, the attachment portion may include second opposing wall portions that hold the engaging portion therebetween in an orthogonal direction that is orthogonal to the longitudinal direction and the insertion direction, and that are provided with a through portion that penetrates in the orthogonal direction. The engaging portion may include a protrusion that is inserted into the through portion, and the movement restricting portion may be formed by the through portion and the protrusion, and may restrict movement of the engaging portion by restricting a movement range of the protrusion to a range within the through portion. With this configuration, movement of the protrusion is restricted by the protrusion coming into contact with the inner wall surface of the through portion, and the movement range is defined only to the inside of the through portion. Accordingly, the engaging portion can be also moved only within a range in which the protrusion can be moved. As a result, even if the engaging portion is urged to move by application of a large load, the protrusion can prevent the movement of the engaging portion by coming into contact with the inner wall surface of the through portion, to receive the load applied to the engaging portion. Therefore, the linking portion is not damaged by being excessively moved or deformed by the applied load.

In this invention, the linking portion may have a pantograph-like shape including first opposing portions that extend from the attachment portion toward the engaging portion so as to be separated from each other, and second opposing portions that are bent from extension ends of the first opposing portions, and that extend toward the engaging portion so as to approach each other, and each of the first opposing portions and the second opposing portions may be an opposing wall portion that extends in the insertion direction, and a cut surface, which is taken along a plane including the longitudinal direction, and an orthogonal direction which is orthogonal to both the longitudinal direction and the insertion direction, is formed so as to approach the engaging portion toward a far side in the insertion direction. With this configuration, when the pantograph-shaped portion formed by the pair of first opposing portions and the pair of second opposing portions is contracted, the engaging portion is moved upward so as to be raised in the insertion direction on the contraction side. Since the wire routing material is located on the opposite side in the insertion direction for the engaging portion, if the engaging portion is likely to be moved or deformed toward the opposite side in the insertion direction, the engaging portion comes into contact with the wire routing material, so that the engaging portion moves so as to slide on the wire routing material, and the engaging portion is not easily moved. However, by the engaging portion being moved so as to be raised in the insertion direction on the side on which the pantograph-shaped portion is contracted, the engaging portion is easily prevented from contacting with and sliding on the wire routing material, and the engaging portion can be easily moved.

In this invention, the linking portion may have a pantograph-like shape including first opposing portions that extend from the attachment portion toward the engaging portion so as to be separated from each other, and second opposing portions that are bent from extension ends of the first opposing portions, and that extend toward the engaging portion so as to approach each other, and the first opposing portions and the second opposing portions may be opposing wall portions that extend in the insertion direction, and a weakened portion may be provided on an inner side of each corner portion of a quadrangular wall portion formed by the four wall portions, the weakened portion facilitating bending deformation in which two wall portions extending from the corner portion approach each other or are separated from each other by using the corner portion as a fulcrum. With this configuration, the pantograph-shaped portion formed by the pair of first opposing portions and the pair of second opposing portions can be more easily extended or contracted. On the other hand, since the movement restricting portion is provided, even if the extension/contraction of the pantograph-shaped portion is facilitated, an excessive extension/contraction can be restricted, and, therefore, there is no risk of damaging.

BRIEF DESCRIPTION OF THE DRAWINGS

FIG. 8 is a bottom view showing a state in which the engaging portion of the engaging member is inserted to the fixing hole as shown in FIG. 5, as viewed from the wire routing material side;

DESCRIPTION OF THE PREFERRED EMBODIMENTS

Hereinafter, one embodiment of this invention will be described with reference to the drawings.

Figure 1:
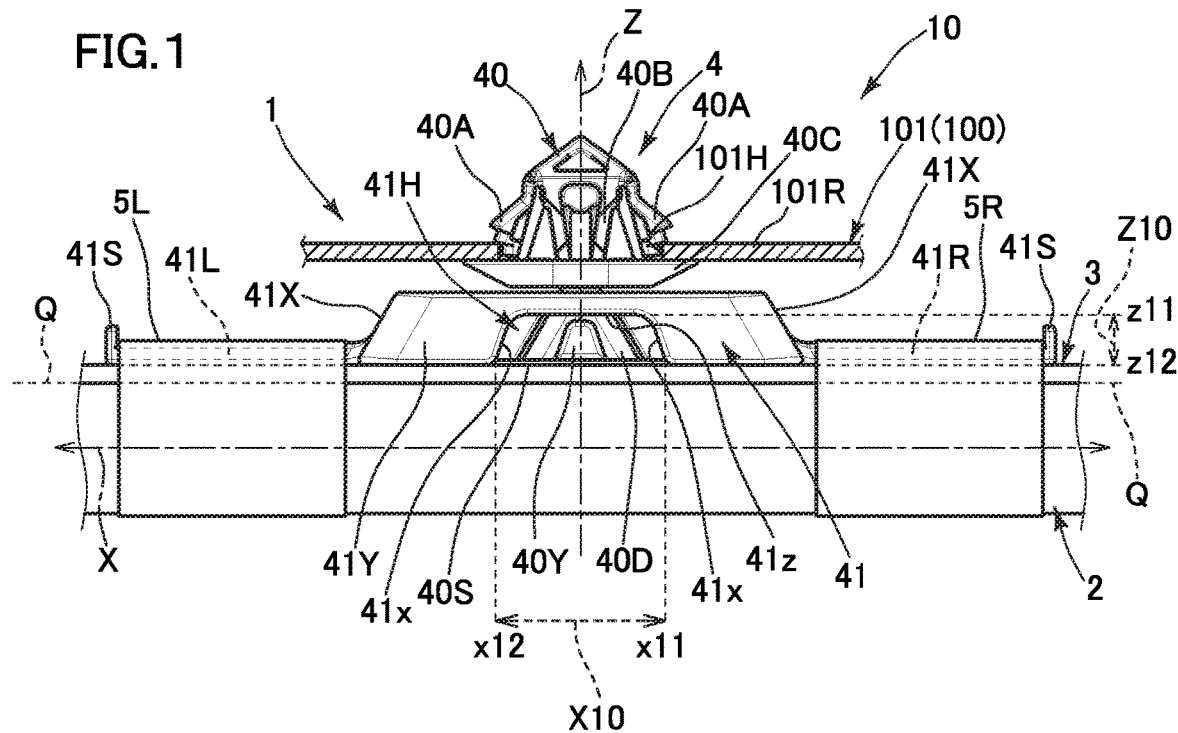
FIG. 1 is a front view of an engaging member, according to an embodiment of this invention, which is fixed to a fixing portion of a vehicle body in a state in which wire routing materials are attached.

In this embodiment, as shown in FIG. 1, a wire routing material binding structure 1 is formed so as to include a flexible wire routing material 2 constituting a first wire routing material, a plate-shaped flat wire routing material 3 constituting a second wire routing material and having higher rigidity than the flexible wire routing material 2, binding members 5R, 5L that bind the elongated wire routing materials 2, 3, and an engaging member 4 including an engaging portion 40 for assembly into a vehicle body 100, an attachment portion 41 for attaching the wire routing materials 2, 3, and linking portions 49R, 49L that connect the engaging portion 40 and the attachment portion 41 to each other.

The flexible wire routing material 2 is a flexible member formed by a bundle of a plurality of wires extending in an elongated manner. The flexible wire routing material 2 is a wire harness that forms a signal line. The flexible wire routing material 2 of this invention is not limited to a wire harness.

The flat wire routing material 3 is a member that has a flat-plate-like shape, extends in an elongated manner, and has higher rigidity and lower flexibility than the flexible wire routing material 2. The flat wire routing material 3 is a metal bus bar that forms a power supply line. The flat wire routing material 3 is formed such that four surfaces forming the outer peripheral surfaces are each formed as a flat surface extending in the longitudinal direction of the flat wire routing material 3. The flat wire routing material 3 of this invention may be an FFC (Flexible Flat Cable) that constitutes a flat cable or an FPC (Flexible Printed Circuit), and is not limited to a bus bar.

Figure 2:
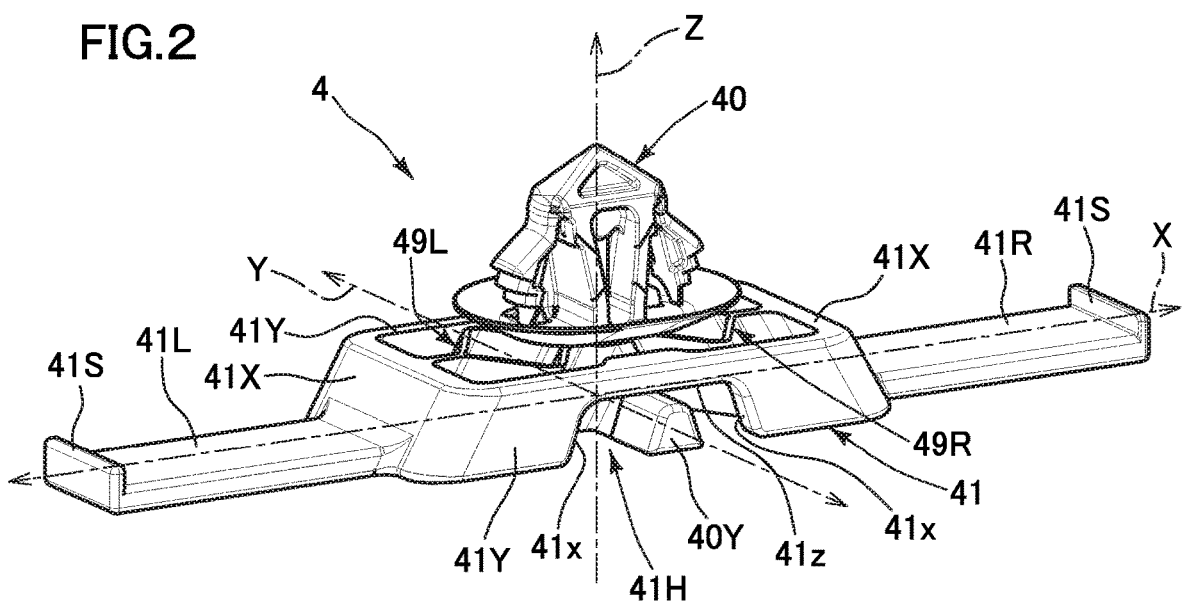
FIG. 2 is a first perspective view of the engaging member shown in FIG. 1.
Figure 3:
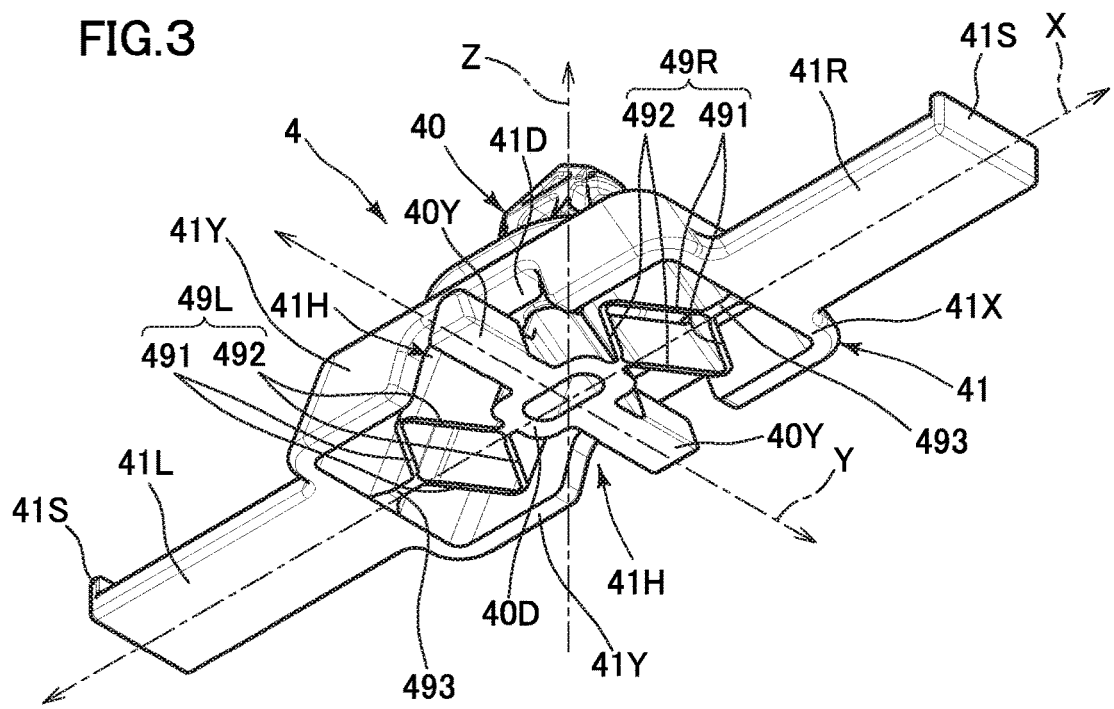
FIG. 3 is a second perspective view of the engaging member shown in FIG. 1 as viewed from a direction different from the direction in FIG. 2.

As shown in FIGS. 1 to 3, the engaging member 4 includes the engaging portion 40 for assembly into the vehicle body 100.

The engaging portion 40 is an anchor portion that is inserted into a predetermined fixing hole 101H (see FIG. 5) of a fixing portion 101 provided in the vehicle body 100, whereby the engaging portion 40 is engaged with and assembled into the fixing hole 101H so as to come into a locking state. As shown in FIGS. 6A, 6B, 7A and 7B, the engaging portion 40 includes a column portion 40B that is inserted into the fixing hole 101H, an elastic locking piece 40A that is inserted into the fixing hole 101H together with the column portion 40B and is engaged, after being inserted, with a peripheral part 101R around the fixing hole 101H so as to come into a locking state, and a contact portion 40C that holds the peripheral part 101R around the fixing hole 101H between the elastic locking piece 40A and the contact portion 40C in the locking state.

The engaging portion 40 is formed so as to protrude on the flat wire routing material 3 side (area located above the broken line Q in FIG. 1) of the engaging member 4, not from the flexible wire routing material 2 side, in a binding and holding state in which the wire routing materials 2, 3 are bound and held together with bound portions 41R, 41L by the binding members 5R, 5L.

The elastic locking piece 40A has a shape that expands from the distal end side (upper side of the column portion 40B in FIGS. 6A, 6B, 7A and 7B) of the column portion 40B so as to be away from column portion 40B toward the proximal end side (lower side of the column portion 40B in FIGS. 6A, 6B, 7A and 7B), and the proximal end side portion is elastically deformable so as to approach the column portion 40B. When inserted into the fixing hole 101H in a predetermined insertion direction Z, the elastic locking piece 40A is pushed inward into the hole (arrow R side in FIG. 6A) by the peripheral part 101R around the fixing hole 101H, and is elastically deformed so as to approach the column portion 40B. However, when inserted into a predetermined position, the elastic locking piece 40A is locked relative to the peripheral part 101R around the fixing hole 101H from the far side (upper side in FIGS. 6A, 6B, 7A and 7B) in the insertion direction Z, and comes into a locking state in which the elastic locking piece 40A is inhibited from being detached in a direction opposite to the insertion direction Z.

The contact portion 40C has a shape extending in a dish-like form from the proximal end side of the column portion 40B in the insertion direction Z, and comes into contact with the peripheral part 101R around the fixing hole 101H so as to form an annular shape. In the above-described locking state, the contact portion 40C *comes* into contact with the peripheral part 101R around the fixing hole 101H from the near side (lower side in FIGS. 6A, 6B, 7A and 7B) in the insertion direction Z, and holds the peripheral part 101R between the elastic locking piece 40A and the contact portion 40C. Consequently, the engaging portion 40 is assembled into the fixing hole 101H so as to come into the locking state. The contact portion 40C also functions to prevent a foreign object (dust, etc.) from entering from the far side (upper side in FIGS. 6A, 6B, 7A and 7B) in the insertion direction Z of the fixing hole 101H to the near side (lower side in FIGS. 6A, 6B, 7A and 7B) through the fixing hole 101H.

As shown in FIGS. 1 to 4, the engaging member 4 includes the attachment portion 41 for attaching the wire routing materials 2, 3.

The attachment portion 41 includes, as a mount portion that is mounted on at least one of the wire routing materials 2, 3, an annular wall portion including first opposing wall portions 41X, 41X that oppose each other in a longitudinal direction X, and second opposing wall portions 41Y, 41Y that oppose each other in an orthogonal direction Y.

The first opposing wall portions 41X, 41X are wall portions that hold the engaging portion 40 (here, a bottom part 40D, of the engaging portion 40, on the side opposite to the insertion direction Z side) therebetween in the longitudinal direction X, and extend in the orthogonal direction Y. The first opposing wall portions 41X, 41X are formed as inclined wall portions that are inclined so as to approach each other toward the far side in the insertion direction Z for the engaging portion 40. On the other hand, the second opposing wall portions 41Y, 41Y are wall portions that hold the engaging portion 40 (here, the bottom part 40D of the engaging portion) therebetween in the orthogonal direction Y, and extend linearly in the longitudinal direction X so as to connect both ends of the first opposing wall portions 41X, 41X to each other.

The attachment portion 41 includes the bound portions 41R, 41L that are bound and held by being enclosed together with the wire routing materials 2, 3 when the wire routing materials 2, 3 are bound by the binding members 5R, 5L.

The bound portions 41R, 41L are sleeve portions that extend in the longitudinal direction X of the wire routing materials 2, 3 in a binding and holding state in which the bound portions 41R, 41L are bound and held together with the wire routing materials 2, 3 by the binding members 5R, 5L. Specifically, as shown in FIG. 1, the bound portion 41R (first side sleeve portion) extends from a first side (right side in FIG. 1) wall portion, among the first opposing wall portions 41X, 41X, in the longitudinal direction X toward the first side. On the other hand, the bound portion 41L (second side sleeve portion) extends in the longitudinal direction X from a second side (left side in FIG. 1) wall portion, among the first opposing wall portions 41X, 41X, on the side opposite to the first side in the longitudinal direction X toward the second side.

As shown in FIG. 1, the binding member 5R (first side binding member) binds, to the engaging portion 40 of the engaging member 4, the bound portion 41R together with the flat wire routing material 3 and the flexible wire routing material 2, on the first side (right side in FIG. 1) in the longitudinal direction X. On the other hand, the binding member 5L (second side binding member) binds the bound portion 41L together with the flat wire routing material 3 and the flexible wire routing material 2, on the second side (left side in FIG. 1) opposite to the first side in the longitudinal direction X.

The binding members 5R, 5L are flexible elongated members, and are tape members in which surfaces (inner circumferential surfaces in the case of the object to be bound being enclosed) facing an object to be bound are adhesive surfaces (not shown). Each of the binding members 5R, 5L adheres at a portion that contacts with the enclosed object to be bound, and both ends of each biding member overlap and adhere to each other, whereby a binding state is obtained.

In this manner, the binding members 5R, 5L bind the bound portions 41R, 41L together with the flat wire routing material 3 and the flexible wire routing material 2, thereby achieving a binding and holding state in which the flat wire routing material 3 and the flexible wire routing material 2 are attached to and held by the engaging member 4.

Each of the bound portions 41R, 41L includes an outer side protrusion 41S that protrudes in the insertion direction Z at an end portion on the outer side in the longitudinal direction X. The outer side protrusions 41S function as a falling-off preventing portion for preventing the binding members 5R, 5L from falling off from the bound portions 41R, 41L to the outside in the longitudinal direction X.

Figure 4:
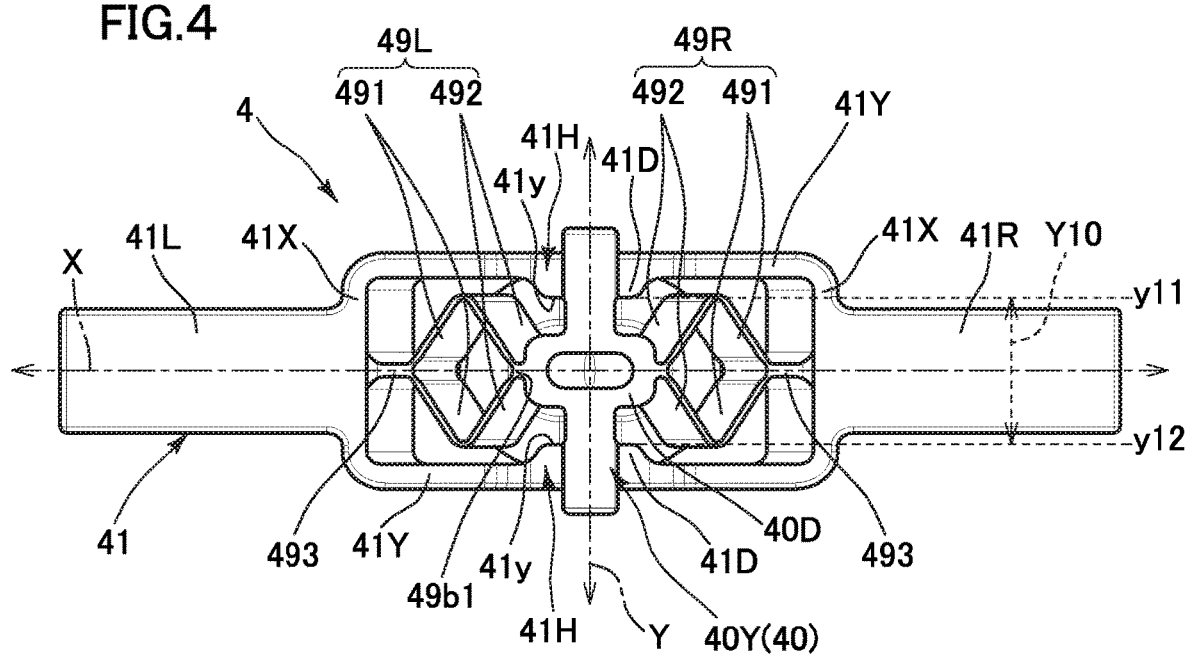
FIG. 4 is a bottom view of the engaging member shown in FIG. 1.

As shown in FIGS. 2 to 4, the engaging member 4 includes linking portions 49R, 49L that connect the engaging portion 40 and the attachment portion 41 to each other.

The linking portions 49R, 49L connect the engaging portion 40 and the attachment portion 41 such that the engaging portion 40 is movable relative to the attachment portion 41 in the orthogonal direction Y and the longitudinal direction X of the wire routing materials 2, 3 attached by the attachment portion 41.

As shown in FIGS. 3 and 4, the linking portions 49R, 49L include a first side linking portion 49R that connects between the first side (right side in FIG. 4) wall portion, among the first opposing wall portions 41X, 41X, in the longitudinal direction X and the bottom part 40D of the engaging portion 40, and a second side linking portion 49L that connects between the second side (left side in FIG. 4) wall portion, among the first opposing wall portions 41X, 41X, in the longitudinal direction X and the bottom part 40D of the engaging portion 40. The linking portions 49R, 49L are connected to the engaging portion 40 between them. The linking portions 49R, 49L are extendable and contractable in the longitudinal direction X of the wire routing materials 2, 3 attached by the attachment portion 41, and the linking portions 49R, 49L can oscillate (swing) the engaging portion 40 side in the orthogonal direction Y that is orthogonal to both the longitudinal direction X and the insertion direction Z in which the engaging portion 40 is inserted in the fixing hole 101H, by using the attachment portion 41 side (the first opposing wall portions 41X, 41X side) as a fulcrum.

Specifically, each linking portion 49R, 49L has a pantograph-like shape including first opposing portions 491, 491 that extend from the first opposing wall portions 41X, 41X of the attachment portion 41 toward the engaging portion 40 so as to be separated from each other, and second opposing portions 492, 492 that are bent from the extension ends of the first opposing portions 491, 491, and that extend toward the engaging portion 40 so as to approach each other. A gap 40S (see FIG. 1) is formed between the linking portions 49R and 49L and the wire routing material 2, 3 (here, the flat wire routing material 3), in a binding and holding state, located immediately below the linking portions 49R and 49L, so that the linking portions 49R, 49L do not come into contact with the wire routing material 2, 3 (flat wire routing material 3) when the engaging portion 40 is moved.

Figure 9:
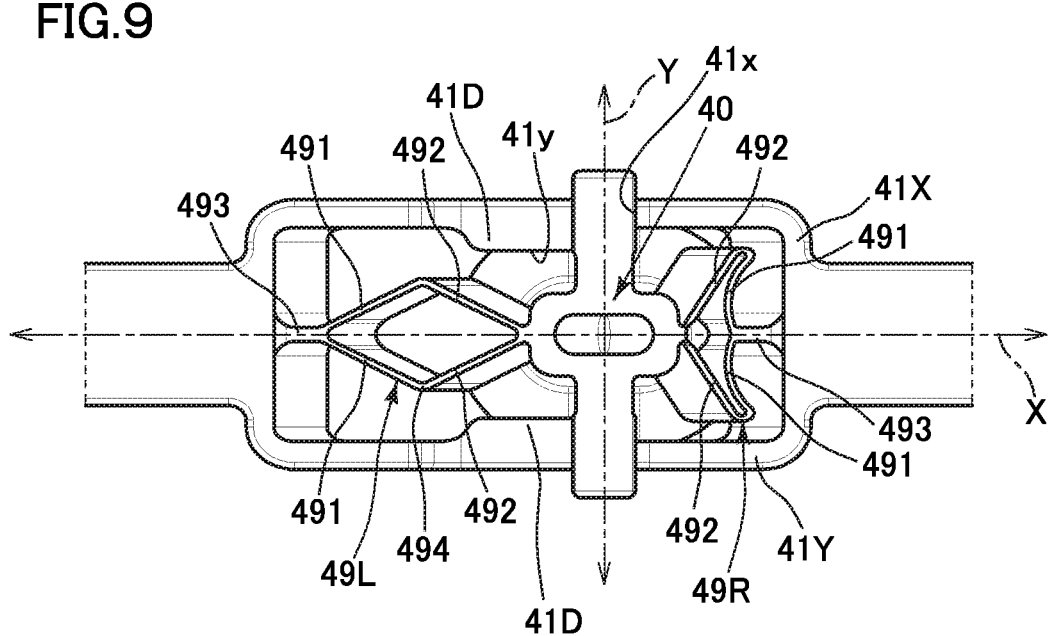
FIG. 9 is a bottom view of the engaging portion of the engaging member shown in FIG. 1 in the case of the engaging portion being moved in a longitudinal direction.

When the engaging portion 40 has been moved to the first side in the longitudinal direction X, the first opposing portions 491, 491 and the second opposing portions 492, 492 of the first side linking portion 49R are in a compressed state in which the opposing portions approach each other, and the first opposing portions 491, 491 and the second opposing portions 492, 492 of the second side linking portion 49L are in an extended state in which the opposing portions are separated from each other, as shown in FIG. 9. When the engaging portion 40 has been moved to the second side in the longitudinal direction X, the first opposing portions 491, 491 and the second opposing portions 492, 492 of the first side linking portion 49R are in the extended state in which the opposing portions are separated from each other, and the first opposing portions 491, 491 and the second opposing portions 492, 492 of the second side linking portion 49L are in the compressed state in which the opposing portions approach each other (not shown), conversely to the state shown in FIG. 9.

The first opposing portions 491, 491 of the linking portions 49R, 49L are connected with longitudinal direction extending portions 493 provided in the attachment portion 41. The longitudinal direction extending portions 493 extend from the first opposing wall portions 41X, 41X of the attachment portion 41 in the longitudinal direction X. Due to the longitudinal direction extending portions 493 being provided, the linking portions 49R, 49L allow connecting portions between the first opposing portions 491, 491 and the second opposing portions 492, 492 to be deformed until the opposing portions reach both sides of each longitudinal direction extending portion 493 in the orthogonal direction as shown in FIG. 9, thereby further extending the movement-allowed range of the engaging portion 40 in the longitudinal direction X.

Figure 10:
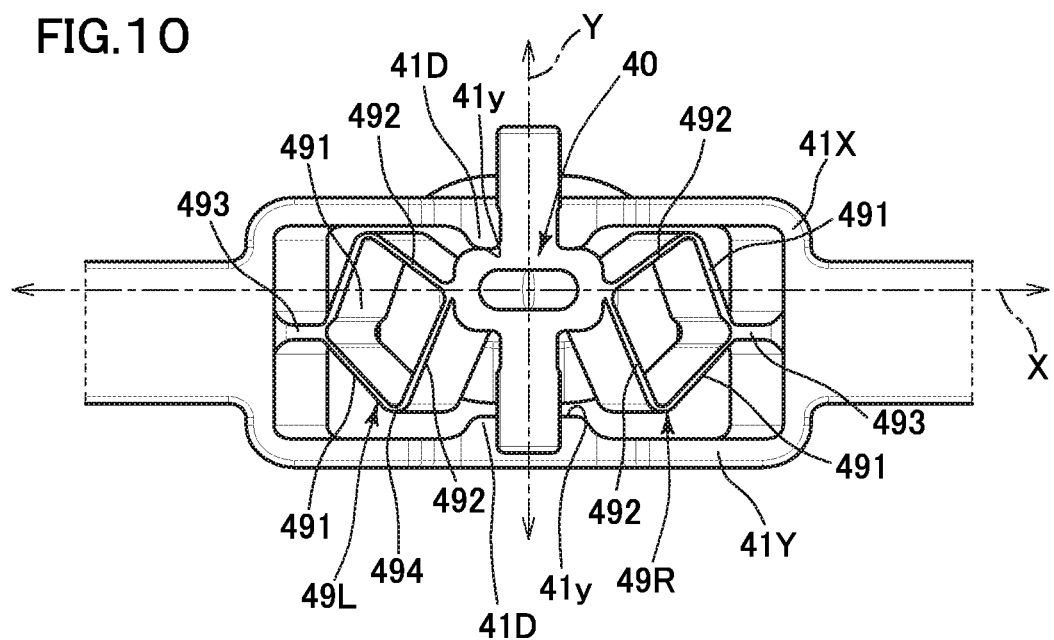
FIG. 10 is a bottom view of the engaging portion of the engaging member shown in FIG. 1 in the case of the engaging portion being moved in an orthogonal direction.

When the engaging portion 40 is moved to the first side in the orthogonal direction Y, both the first opposing portions 491, 491 and the second opposing portions 492, 492 of the linking portions 49R, 49L are slightly extended to move the engaging portion 40 side portion toward the first side in the orthogonal direction Y by using, as a fulcrum, the connection portions between the first opposing portions 491, 491 and the longitudinal direction extending portions 493, 493, as shown in FIG. 10. On the other hand, when the engaging portion 40 is moved to the second side opposite to the first side in the orthogonal direction Y, both the first opposing portions 491, 491 and the second opposing portions 492, 492 of the first side linking portion 49R are slightly extended to move the engaging portion 40 side portion toward the second side in the orthogonal direction Y by using, as a fulcrum, the connection portion between the first opposing portions 491, 491 and the longitudinal direction extending portions 493, 493 (not shown), conversely to the state shown in FIG. 10.

Thus, the linking portions 49R, 49L are movable in the orthogonal direction Y and the longitudinal direction X of the engaging portion 40. That is, the engaging portion 40 is movable in an XY plane formed by the longitudinal direction X and the orthogonal direction Y in the engaging member 4.

However, the engaging member 4 includes movement restricting means provided so as to narrow a range in which the engaging portion 40 can be moved by the linking portions 49R, 49L. That is, the engaging member 4 includes, as first movement restricting means (longitudinal direction movement restricting means in this invention) for restricting the movement of the engaging portion 40 to movement within a predetermined range X10 in the longitudinal direction X in FIG. 1, a through portion 41H that is formed so as to extend through each of the second opposing wall portions 41Y, 41Y in the orthogonal direction Y and have inner wall surfaces 41x on both sides in the longitudinal direction X, and a protrusion 40Y that is formed so as to be inserted in the through portion 41H from the bottom part 40D of the engaging portion 40 and protrude outward of the second opposing wall portions 41Y, 41Y. Consequently, the movement-allowed range of the protrusion 40Y in the longitudinal direction X is within the through portion 41H, and the movement of the engaging portion 40 is also restricted to movement within the movement-allowed range of the protrusion 40Y.

Specifically, when the engaging portion 40 is moved to the first side (right side in FIG. 1) in the longitudinal direction X, the protrusion 40Y is also moved to the first side. However, the protrusion 40Y comes into contact with the inner wall surface 41x (see FIG. 1) of the through portion 41H on the first side, and, therefore, the movement toward the first side beyond a contact position x11 is restricted. Similarly, when the engaging portion 40 is moved to the second side (left side in FIG. 1) in the longitudinal direction X, the protrusion 40Y comes into contact with the inner wall surface 41x of the through portion 41H on the second side, and, therefore, the movement toward the second side beyond a contact position x12 is restricted. That is, the engaging portion 40 is movable in the longitudinal direction X only within the range X10 in which the protrusion 40Y can be moved.

The engaging member 4 includes, as second movement restricting means for restricting the movement of the engaging portion 40 in the orthogonal direction Y to movement within a predetermined range Y10 (see FIG. 4) in the orthogonal direction Y, protrusions 41D, 41D that are formed in the second opposing wall portions 41Y, 41Y, respectively, so as to oppose each other and protrude inward in the orthogonal direction Y, and a bottom part 40D of the engaging portion 40. The movement of the engaging portion 40 is restricted by the movement range of the bottom part 40D of the engaging portion 40 in the orthogonal direction Y being restricted to movement within the opposing interval between the protrusions 41D, 41D.

Specifically, when the engaging portion 40 is moved to the first side (upper side in FIG. 4) in the orthogonal direction Y, the bottom part 40D of the engaging portion 40 is also moved to the first side. However, the bottom part 40D comes into contact with a protruding end surface 41y (see FIG. 4) of the protrusion 41D on the first side in the orthogonal direction Y, and, therefore, the movement to the first side beyond a contact position y11 is restricted. Similarly, when the engaging portion 40 is moved to a second side (lower side in FIG. 4) in the orthogonal direction Y, the bottom part 40D comes into contact with a protruding end surface 41y of the protrusion 41D on the second side in the orthogonal direction Y, and, therefore, the movement to the second side beyond a contact position y12 is restricted. That is, the engaging portion 40 is movable in the orthogonal direction Y only within the range Y10 in which the bottom part 40D can be moved.

Since the first opposing portions 491, 491 and the second opposing portions 492, 492 are deformed in the insertion direction Z by application of a force in the insertion direction Z, the engaging portion 40 can be moved in the insertion direction Z (upper direction in FIG. 1). As shown in FIG. 1, the engaging member 4 includes the through portion 41H and the protrusion 40Y described above, as third movement restricting means (insertion direction movement restricting means in this invention) for restricting the movement of the engaging portion 40 in the insertion direction Z to movement within a predetermined range Z10 (see FIG. 1) in the insertion direction Z. The through portion 41H extends through each of the second opposing wall portions 41Y, 41Y in the orthogonal direction Y, and includes an inner wall surface 41z at least in the insertion direction Z, and, therefore, the engaging portion 40 comes into contact with the inner wall surface 41z (see FIG. 1) when the protrusion 40Y is moved in the insertion direction Z of the through portion 41H, thereby restricting the movement in the insertion direction Z beyond a contact position z11. The engaging portion 40 comes into contact with the wire routing material 2, 3 (here, the flat wire routing material 3) when the protrusion 40Y is moved to the opposite side (lower side in FIG. 1) in the insertion direction Z, and, therefore, the movement toward the opposite side in the insertion direction Z beyond a contact position z12 is restricted. That is, the engaging portion 40 is movable on both sides in the insertion direction Z only in the range Z10 in which the protrusion 40Y can be moved.

Figure 12:
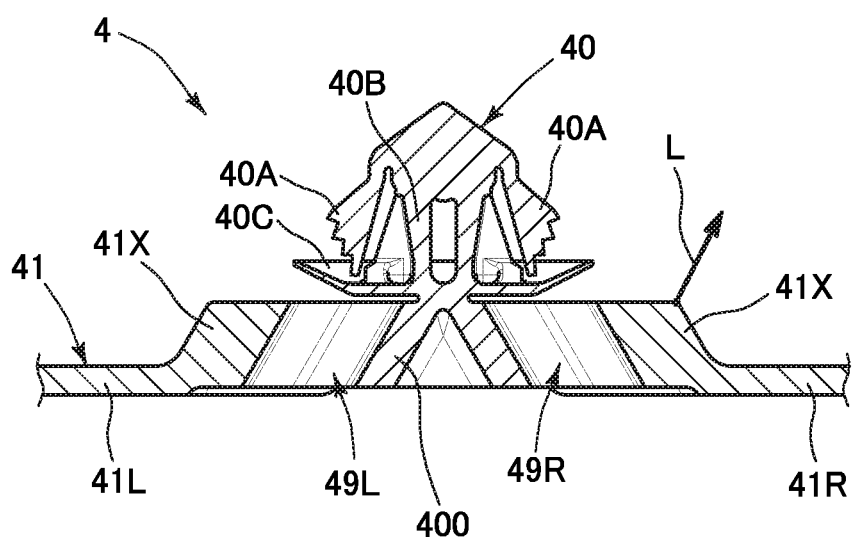
FIG. 12 is a diagram showing a state in which the engaging portion of the engaging member shown in FIG. 1 is moved in the longitudinal direction, in a cross-sectional view taken along the line XII-XII in FIG. 8.

The first opposing portions 491, 491 and the second opposing portions 492, 492 are opposing wall portions that extend in the insertion direction Z, and a cut surface which is taken along a plane including both the longitudinal direction X and the orthogonal direction Y forms an inclined wall portion that is inclined so as to approach the engaging portion 40 toward the far side in the insertion direction Z. With this configuration, when one of the pantograph-like shapes including the first opposing portions 491, 491 and the second opposing portions 492, 492 is contracted, the contracted pantograph-like shape side portion (in the case of FIG. 9, the right side of the engaging portion 40) of the engaging portion 40 is moved in the insertion direction Z (arrow L direction in FIG. 12) so as to be raised in the insertion direction Z. Accordingly, the protrusion 40Y and the bottom part 40D of the engaging portion 40 are less likely to come into contact with the wire routing material 2, 3 (here, the flat wire routing material 3), and the engaging portion 40 is less likely to slide on the wire routing materials 2, 3 when being moved in the longitudinal direction X or the orthogonal direction Y.

Thus, in consideration of at least one of the structure in which the linking portions 49R, 49L are less likely to be moved in the direction opposite to the insertion direction Z, and the structure in which the wire routing materials 2, 3 are attached to the engaging member 4 on the side opposite to the insertion direction Z side, no wall portions are provided in the through portion 41H on the side opposite to the insertion direction Z side in the second opposing wall portions 41Y, 41Y. An opening is formed on the side opposite to the insertion direction Z side, and the opening facilitates the removal of a mold during molding.

Figure 11:
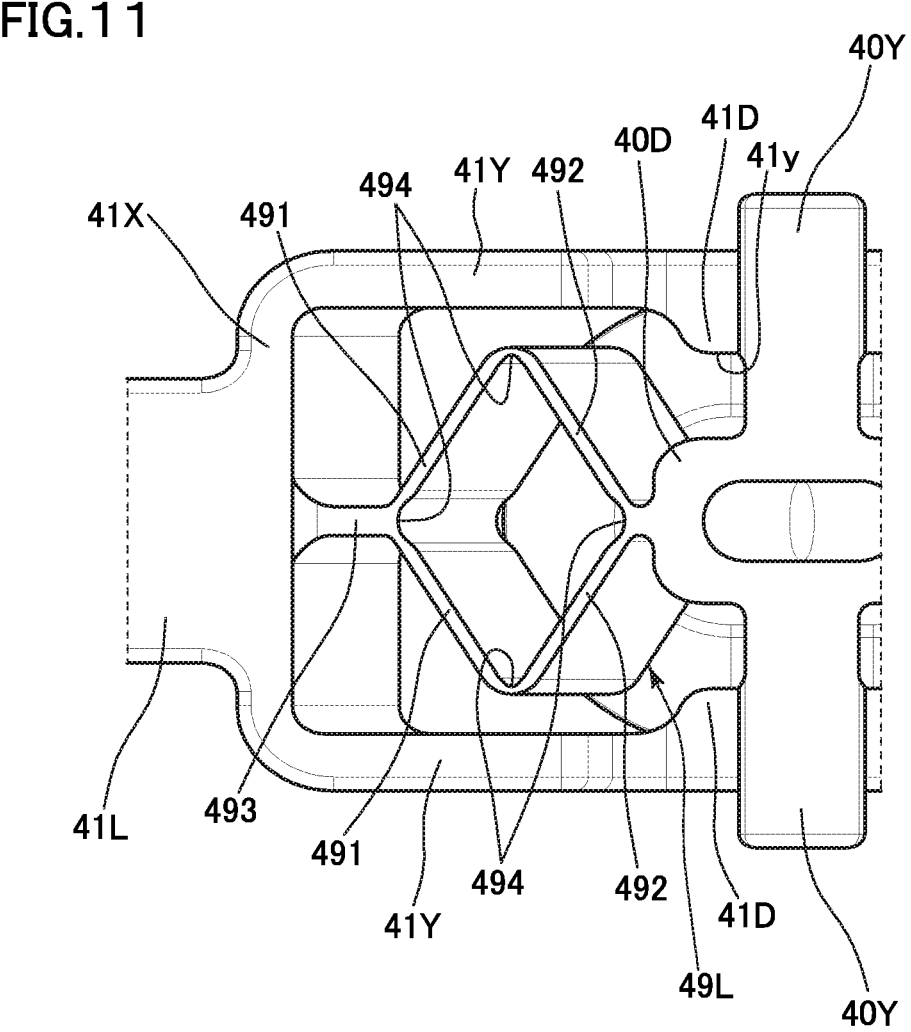
FIG. 11 is a partial enlarged view of FIG. 4.

Each of the first opposing portions 491, 491 and the second opposing portions 492, 492 is an opposing wall portion extending in the insertion direction Z, and a weakened portion 494 is provided on the inner side of each corner portion of a quadrangular wall portion formed by these four wall portions 491, 491, 492, 492, as shown in FIG. 11. The weakened portion 494 is a recess provided in the inner wall of each of the four corner portions, more specifically, a thinned portion in which a groove portion extending in the insertion direction Z is formed, and facilitates bending deformation in which two wall portions (opposing portions) extending from the corner portion approach each other or are separated from each other by using the corner portions as fulcrums.

Figure 5:
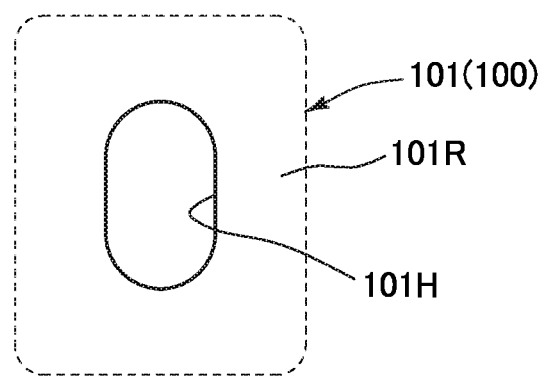
FIG. 5 is a plan view showing a fixing hole of the vehicle body into which the engaging member is inserted and fixed in a binding structure shown in FIG. 1.
Figure 6A:
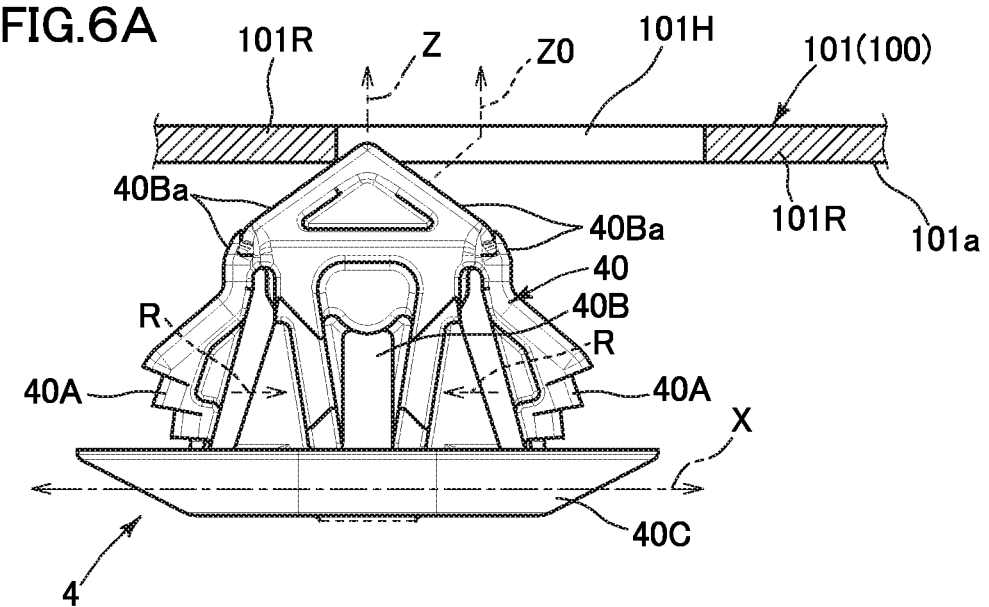
FIG. 6A is a front view showing states before an engaging portion of the engaging member shown in FIG. 1 is inserted into the fixing hole shown in FIG. 5, as viewed from the front of the engaging member.
Figure 6B:
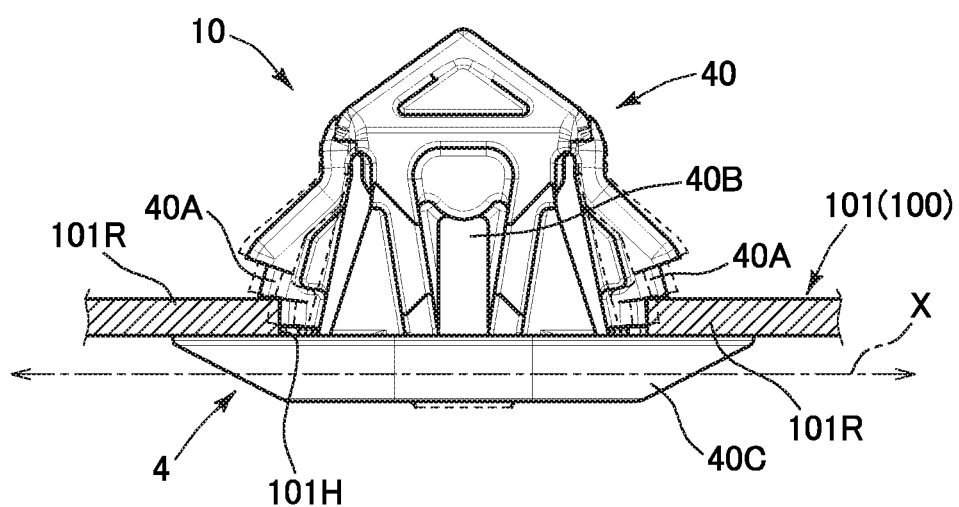
FIG. 6B is a front view showing states after the engaging portion of the engaging member shown in FIG. 1 is inserted into the fixing hole shown in FIG. 5, as viewed from the front of the engaging member.
Figure 7A:
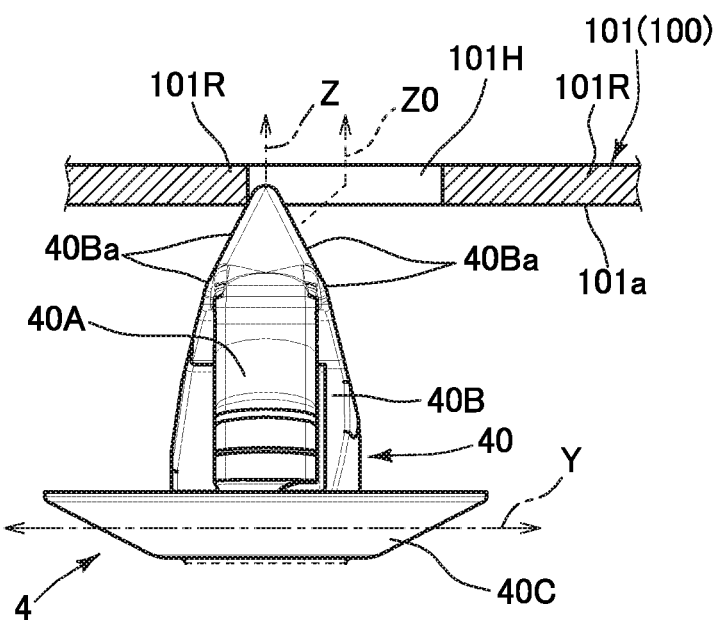
FIG. 7A is a side view showing states before the engaging portion of the engaging member shown in FIG. 1 is inserted into the fixing hole shown in FIG. 5, as viewed from a lateral side of the engaging member.
Figure 7B:
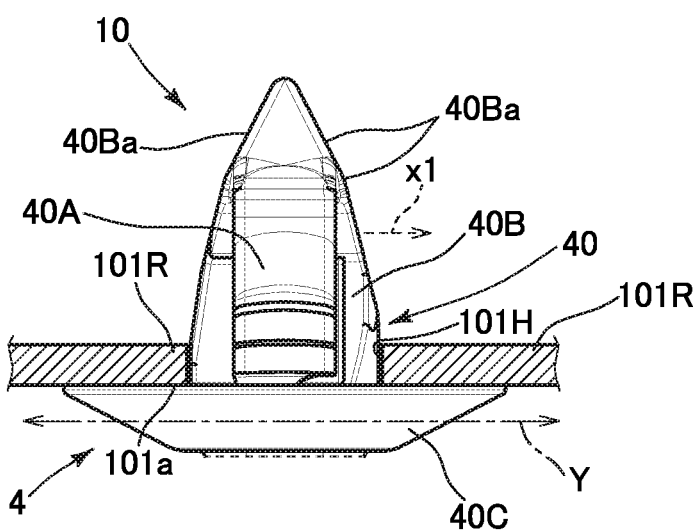
FIG. 7B is a side view showing states after the engaging portion of the engaging member shown in FIG. 1 is inserted into the fixing hole shown in FIG. 5, as viewed from a lateral side of the engaging member.

In this embodiment, an assembling structure 10 for the engaging member 4 is formed for inserting and assembling the engaging member 4 that holds the elongated wire routing materials 2, 3, into the fixing hole 101H of the vehicle body 100, as shown in FIGS. 6B and 7B. In the assembling structure 10, the fixing hole 101H has a long hole shape having an opening elongated in a predetermined long width direction as shown in FIG. 5, and the engaging portion 40 of the engaging member 4 is assembled by being inserted into and engaged with the fixing hole 101H.

As shown in FIGS. 6A and 7A, a head surface 40Ba (leading end surface on the front side in the insertion direction Z) of the engaging portion 40 in the case of the engaging portion 40 being inserted into the fixing hole 101H forms an inclined surface that is inclined so as to be closer to the rear side in the insertion direction Z toward the outer circumferential side. Accordingly, as long as the leading end of the engaging portion 40 in the insertion direction Z is located inside the fixing hole 101H when the engaging portion 40 is inserted into the fixing hole 101H of the vehicle body 100, insertion of the engaging portion 40 proceeds, simply by pushing the engaging member 4 in the insertion direction Z, along a direction as indicated by an arrow Z0, according to the inner edge of the fixing hole 101H sliding on the head surface 40Ba that forms the inclined surface. Although the engaging portion 40 is pressed by the inner edge of the fixing hole 101H at this time, the position of the engaging member 4 can be moved in the two directions X and Y as described above, and, therefore, the engaging portion 40 is allowed to reach a position at which the engaging portion 40 can be inserted, while changing its position during the pressing. Finally, the engaging portion 40 is assembled into the vehicle body 100 by being inserted and locked into the fixing hole 101H.

As shown in FIG. 1, a non-inserted portion (here, the bottom part 40D of the engaging portion 40) that is not inserted into the fixing hole 101H when the engaging portion 40 is inserted and assembled into the fixing hole 101H includes the protrusions 40Y, 40Y that protrude outward of the wire routing materials 2, 3 in the orthogonal direction Y. With this configuration, even in a state in which the engaging member 4 is assembled into the fixing hole 101H of the vehicle body 100, the protrusions 40Y, 40Y can be viewed from the front side in the insertion direction Z of the fixing hole 101H (i.e., from the worker who assembles the engaging member 4), as shown in FIG. 8. Similarly, the first opposing wall portions 41X, 41X and the second opposing wall portions 41Y, 41Y can also be viewed from the front side in the insertion direction Z of the fixing hole 101H. Accordingly, the worker who assembles the engaging member 4 can know the position of the engaging portion 40 from the positional relationship between the protrusions 40Y, 40Y and the opposing wall portions 41X, 41X, 41Y, 41Y, and, therefore, the insertion and assembly into the fixing hole 101H is facilitated.

As shown in FIG. 8, the peripheral part 101R around the fixing hole 101H is formed such that marker portions 101Q, 101Q are formed, at positions separated from the fixing hole 101H by a predetermined distance, on both sides in the orthogonal direction Y across the fixing hole 101H, at a surface 101a on the side where the engaging portion 40 is inserted. With this configuration, the opposing interval between the protrusion 40Y and each marker portion 101Q in the orthogonal direction Y makes it easy to know a position, in the elongated fixing hole 101H, at which the engaging portion 40 is assembled, and know one of the marker portions 101Q, 101Q, toward which the assembling position of the engaging portion 40 is offset. This configuration is also advantageous in that the position at which the engaging portion 40 is assembled into the fixing hole 101H can be viewed from the worker who has inserted and assembled the engaging portion 40. The marker portions 101Q, 101Q can be formed by projections or recesses. In the description herein, the marker portions 101Q, 101Q are formed as recesses that are recessed in a cylindrical shape from the surface 101a.

As shown in FIG. 4, the protrusions 40Y are formed so as to protrude on both sides in the orthogonal direction Y from the above-described non-inserted portion (here, the bottom part 40D of the engaging portion 40), and the marker portions 101Q are provided on both sides in the orthogonal direction Y across the fixing hole 101H, as shown in FIG. 8. Then, the protrusions 40Y, 40Y and the marker portions 101Q, 101Q are seen to be located on the same straight line extending in the orthogonal direction Y, when the fixing hole 101H is seen in a front view from the side at which the engaging portion 40 is inserted. That is, the protrusions 40Y, 40Y and the marker portions 101Q, 101Q are linearly aligned in the orthogonal direction Y, and, therefore, the opposing interval therebetween can be more easily recognized.

Although one embodiment of this invention has been described above, this embodiment is merely illustrative. This invention is not limited thereto, and various modifications such as additions and omissions may be made on the basis of the knowledge of a person skilled in the art without departing from the scope of the claims.

Hereinafter, other embodiments different from the above embodiment, and modifications thereof, will be described. Parts having the same functions as those in the above embodiment are denoted by the same reference characters, and the detailed description thereof is omitted. The above embodiment and the following modifications and other embodiments may be combined to be implemented as appropriate as long as no technical contradiction arises.

For example, in this invention, the flexible wire routing material 2 may be omitted, and only the flat wire routing material 3 may be used. Conversely, the flat wire routing material 3 may be omitted, and only the flexible wire routing material 2 may be used.

Although two bound portions 41R, 41L are provided as bound portions in the above embodiment, one of the bound portions 41R, 41L may be provided. Although the binding members 5R, 5L function as the first side binding member and the second side binding member, respectively, in the above embodiment, only one of the binding members 5R, 5L may be provided.

The attachment portion in the above embodiment is provided as the bound portions 41R, 41L, and the wire routing materials 2, 3 are attached to the engaging member 4 using the binding members 5R, 5L, which are separate members. However, for example, the attachment portion may be provided so as to include a belt portion that encloses the wire routing materials 2, 3, and a buckle portion (not shown) that fixes both ends of the belt portion, and the wire routing materials 2, 3 may be attached to the engaging member 4 without using a separate member.

Although two linking portions 49R, 49L are provided as linking portions in the above embodiment, it is possible to use any linking portion that connects the engaging portion 40 and the attachment portion 41 to each other such that the engaging portion 40 is movable relative to the attachment portion 41 in the longitudinal direction X and the orthogonal direction Y. For example, one of the linking portions 49R, 49L may be provided, or two or more linking portions 49R, 49L may be provided. In the case where two or more linking portions 49R, 49L are provided, the linking portions 49R, 49L each of which forms a pantograph-like shape may be arranged also in the orthogonal direction Y, as in the longitudinal direction X. The pantograph-like shape includes a diamond shape and a diamond-like shape, and may further include a V-like shape and a round shape.

In the above embodiment, the longitudinal direction extending portion 493 belongs to the attachment portion 41, and functions as an oscillation fulcrum for the linking portions 49R, 49L connected therewith. However, the longitudinal direction extending portion 493 may belong to the linking portions 49R, 49L, and may be configured such that the side connected with the first opposing portions 491, 491 oscillates in the orthogonal direction Y using, as a fulcrum, the connection portions with the first opposing wall portions 41X, 41X of the attachment portion 41.

Although the movement restriction in the above embodiment is performed in both the insertion direction Z and the longitudinal direction X, the movement restriction may be performed in one of these directions.

DESCRIPTION OF THE REFERENCE CHARACTERS

1 wire routing material binding structure
10 assembling structure for engaging member
2 flexible wire routing material
3 flat wire routing material 4 engaging member
40 engaging portion
40D bottom part of engaging portion
40Y protrusion (movement restricting means)
41H through portion (movement restricting means)
41 attachment portion
41X first opposing wall portion
41Y second opposing wall portion
49 linking portion (first side linking portion, second side linking portion)
491 first opposing portion
492 second opposing portion
494 weakened portion
100 vehicle body
101H fixing hole
X longitudinal direction
Y orthogonal direction
Z insertion direction
X10 predetermined range in longitudinal direction
Y10 predetermined range in orthogonal direction
Z10 predetermined range in insertion direction

What is claimed is:

1. An engaging member comprising:
an engaging portion configured to be inserted and assembled into a fixing hole of a vehicle body;
an attachment portion configured to attach an elongated wire routing material;
a linking portion configured to connect the engaging portion and the attachment portion to each other such that the engaging portion is movable relative to the attachment portion in at least a longitudinal direction of the wire routing material attached by the attachment portion; and
a movement restricting portion configured to restrict movement of the engaging portion relative to the attachment portion in both of an insertion direction in the fixing hole and the longitudinal direction of the wire routing material, to movement within a predetermined range respectively, wherein
the engaging portion includes a column portion and an elastic locking piece that are inserted into the fixing hole at the distal end side of the engaging portion, and a bottom part that is not inserted into the fixing hole at the proximal end side of the engaging portion,
the attachment portion includes an annular wall portion including first opposing wall portions that are opposing each other so as to shield the bottom part of the engaging portion in the longitudinal direction, and second opposing wall portions that are opposing each other so as to shield the bottom part of the engaging portion in an orthogonal direction that is orthogonal to both the longitudinal direction of the wire routing material and the insertion direction in the fixing hole,
the linking portion includes a first side linking portion that connects one of the first opposing wall portions and the bottom part of the engaging portion to each other, and a second side linking portion that connects the other of the first opposing wall portions and the bottom part of the engaging portion to each other,
the second opposing wall portions are partially cut out so that the bottom part of the engaging portion can be viewed from the orthogonal direction, thereby forming a through portion penetrating the inside and outside of the second opposing wall portions in the orthogonal direction,
at the bottom part of the engaging portion, a protrusion is provided that extends toward one side and the other side of the second opposing wall portions and is inserted into the through portion, and
the movement restricting portion is formed by the through portion and the protrusion, and restricts movement of the engaging portion in both of the insertion direction in the fixing hole and the longitudinal direction of the wire routing material by restricting a movement range of the protrusion to a range within the through portion.

2. The engaging member according to claim 1, wherein the linking portion has a pantograph-like shape including first opposing portions that extend from the attachment portion toward the engaging portion so as to be separated from each other, and second opposing portions that are bent from extension ends of the first opposing portions, and that extend toward the engaging portion so as to approach each other, and
each of the first opposing portions and the second opposing portions is an opposing wall portion that extends in the insertion direction in the fixing hole, and a cut surface, which is taken along a plane including the longitudinal direction of the wire routing material, and the orthogonal direction which is orthogonal to both the longitudinal direction of the wire routing material and the insertion direction in the fixing hole, is formed so as to approach the engaging portion toward a far side in the insertion direction in the fixing hole so that each of the first opposing portions and the second opposing portions constitutes an inclined wall portion that is inclined with respect to the insertion direction in the fixing hole.

3. The engaging member according to claim 1, wherein the linking portion has a pantograph-like shape including first opposing portions that extend from the attachment portion toward the engaging portion so as to be separated from each other, and second opposing portions that are bent from extension ends of the first opposing portions, and that extend toward the engaging portion so as to approach each other, and
the first opposing portions and the second opposing portions are opposing wall portions that extend in the insertion direction in the fixing hole, and a weakened portion is provided on an inner side of each corner portion of a quadrangular wall portion formed by the four wall portions, the weakened portion facilitating bending deformation in which two wall portions extending from the corner portion approach each other or are separated from each other by using the corner portion as a fulcrum.

* * * * *